E. I. & E. B. OLINGER.
REELING APPARATUS.
APPLICATION FILED MAR. 29, 1910.
1,010,517.
Patented Dec. 5, 1911.
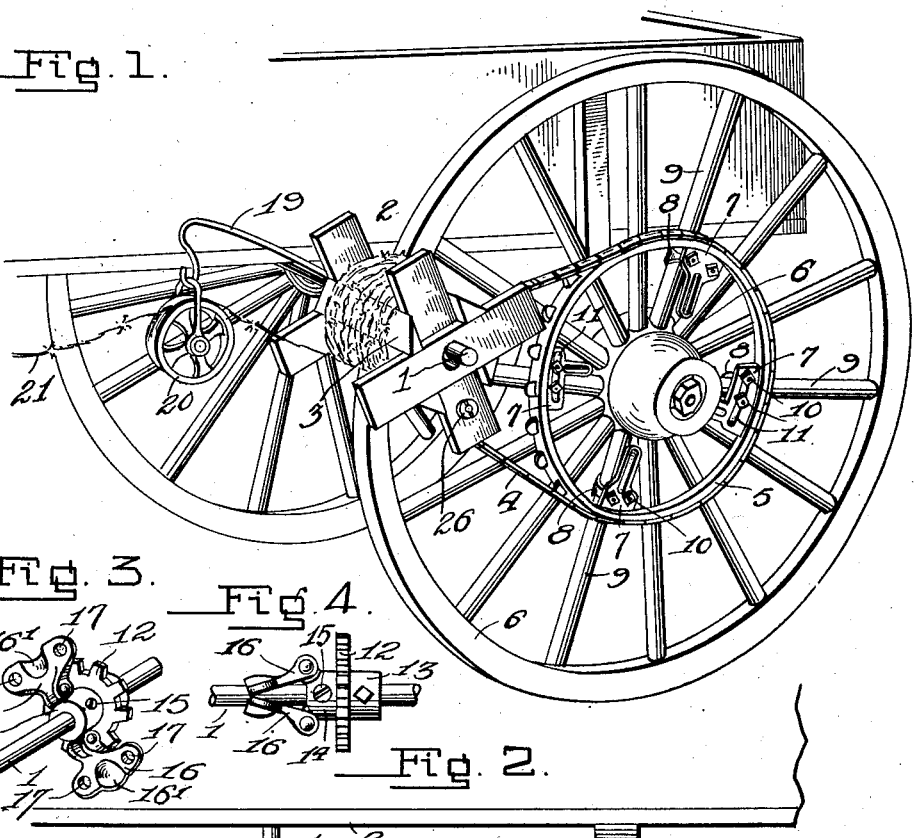
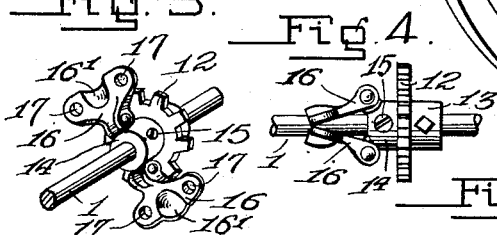
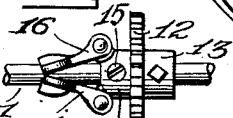
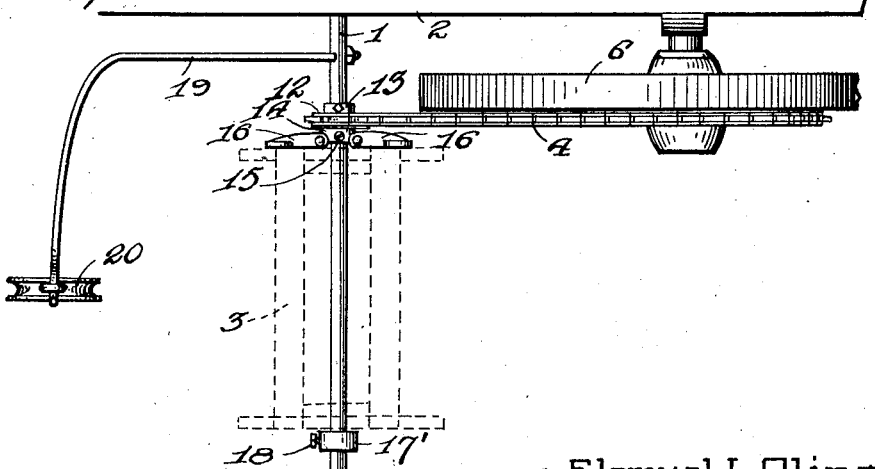
Inventors
Elemuel I. Olinger
Ernest B. Olinger

UNITED STATES PATENT OFFICE.

ELEMUEL I. OLINGER AND ERNEST B. OLINGER, OF POLLOCK, MISSOURI.

REELING APPARATUS.

1,010,517. Specification of Letters Patent. Patented Dec. 5, 1911.

Application filed March 29, 1910. Serial No. 552,195.

*To all whom it may concern:*

Be it known that we, ELEMUEL I. OLINGER and ERNEST B. OLINGER, citizens of the United States of America, residing at Pollock, in the county of Sullivan and State of Missouri, have invented certain new and useful Improvements in Reeling Apparatus, of which the following is a specification, reference being had therein to the accompanying drawing.

This invention relates to that class of apparatus which is attached to a vehicle and is operated thereby to wind wire upon a reel.

The invention has for its object to provide an improved apparatus of this kind by means of which not only can wire be wound upon a reel by the movement of the vehicle, but also by means of which the reel may be manually operated to wind or stretch the wire by rotating the reel independently of the vehicle operating mechanism.

The invention has for its further object to provide improved details of construction by means of which the reel may be convertibly used for either tightening wire or taking up the slack in the same, or reeling the wire upon the reel.

With these and other objects in view, the invention consists in certain novel constructions, combinations and arrangements of parts, as will be hereinafter fully set forth, described and claimed.

Referring to the accompanying drawings.—Figure 1 is an enlarged view in perspective of a portion of a wagon body and the rear wheels thereof, with an apparatus constructed in accordance with this invention applied thereto. Fig. 2 is a plan view showing a portion of the apparatus with the reel shown in dotted lines. Fig. 3 is a detail view in perspective showing the means of securing the reel on its shaft. Fig. 4 is a detail view showing the position of the means for securing the reel to its shaft when the reel has been removed.

In carrying out the invention a rod 1 is mounted in any suitable manner to the underside of the wagon body, 2, and projects laterally therefrom. Upon the rod 1 is loosely mounted to rotate thereon the reel, 3, which is operated by means of an endless chain, 4, extending around a large toothed wheel, 5, mounted on one of the rear wheels 6, of the wagon in any suitable manner, and as here shown, preferably mounted detachably thereon by means of projections, 7, having adjustable clamps, 8, which engage the spokes, 9, of the wheel, and are clamped in position by means of nuts, 10, threaded on the ends of the clamps, 8, projecting through slotted projections, 7. The endless sprocket chain 4 passes over a toothed pinion, 12, on the rod 1, abutting on one side against a sleeve, 13, fixed to the rod 1 and having attached to its other side a sleeve, 14, which is held on the rod 1 by means of a set screw, 15. The reel 3 is secured to the sleeve 14 in any suitable manner, and as here shown, preferably by means of the members, 16, hinged to the sleeve 14 and having holes 17, to receive adjustable screws by means of which they are fastened to the reel 3. The reel is held in place by means of a sleeve 17' on the rod 1 bearing against the other end of the reel and held upon the rod 1 by means of a set screw, 18. Projecting from the rod 1 is a bent arm 19, having mounted on its end a grooved roller, 20, serving as a guide for the wire, 21, passing over the same and wound about the reel, 3. It will be seen that by means of this construction the reel will be rotated to wind up the wire 21 thereon as the vehicle advances.

The reel 3 may be removed from the rod 1 by removing the sleeve 17' and detaching the hinged members 16 from the reel. When the reel is detached from the hinged members 16, they may be folded up out of the way against the rod 1, as shown in Fig. 6, each of the hinged members 16 having a recess 16' adapted to fit over the rod 1.

Having described the invention, we claim:

In an apparatus of the kind described, a rod projecting from the side of a wagon, a sleeve secured to said rod, a second sleeve secured to said rod adjacent to said first named sleeve, a pinion mounted on said rod between said sleeves, and connected to the second sleeve, arms hinged to said second sleeve, each having a recess on its inner surface, said arms being adapted to be folded against said rod, and said recesses inclosing said rod, a reel mounted on said rod and detachably secured to said arms, and means on said rod adjacent to the end of said reel opposite to said sleeves for holding the reel in place, a sprocket wheel detachably secured to the spokes of the wagon wheel, and a sprocket chain connecting said sprocket wheel with said pinion.

In testimony whereof we hereunto affix our signatures in presence of two witnesses.

ELEMUEL I. OLINGER.
ERNEST B. OLINGER.

Witnesses:
ELIAS PETERMAN,
JOSIE MATTHEW.

Copies of this patent may be obtained for five cents each, by addressing the "Commissioner of Patents, Washington, D. C."